United States Patent [19]

Fisher et al.

[11] 4,347,730

[45] Sep. 7, 1982

[54] METHOD AND APPARATUS FOR CALIBRATING GYROSCOPICALLY-STABILIZED, MAGNETICALLY-SLAVED HEADING REFERENCE SYSTEM

[75] Inventors: Matthew J. Fisher, Eatontown, N.J.; William J. Gregory, Jr., Pelham, N.H.

[73] Assignee: The United States of America as represented by the Secretary of the Army, Washington, D.C.

[21] Appl. No.: 122,780

[22] Filed: Feb. 19, 1980

Related U.S. Application Data

[63] Continuation-in-part of Ser. No. 5,255, Jan. 22, 1979, abandoned.

[51] Int. Cl.³ .............................................. G01C 17/38
[52] U.S. Cl. .................................. 73/1 E; 73/178 R
[58] Field of Search ............................ 73/1 E, 178 R; 33/317 D, 356

[56] References Cited

U.S. PATENT DOCUMENTS

| 3,835,376 | 9/1974 | Rorner | 33/361 |
| 4,024,382 | 5/1977 | Fowler | 33/356 |
| 4,031,630 | 6/1977 | Fowler | 33/356 |
| 4,143,467 | 3/1979 | Erspamer et al. | 33/356 |
| 4,143,467 | 3/1979 | Erspamer | 73/1 E |

Primary Examiner—Donald O. Woodiel
Attorney, Agent, or Firm—Nathan Edelberg; Jeremiah G. Murray; Michael C. Sachs

[57] ABSTRACT

A heading reference system mounted in a vehicle, e.g. an aircraft or a tank, includes a magnetic compass and a gyroscope. The magnetic compass is subject to deviation in the magnetic field, hence the system must be calibrated. If the vehicle is oriented in a starting direction, and the output of the magnetic compass compared to the output of the gyroscope, an error signal is developed. This error signal is filtered to reduce noise, then stored. The vehicle is then re-oriented and the procedure repeated until sufficient information is available to calibrate the system. A microprocessor may be used for the computations and filtering of noise.

22 Claims, 2 Drawing Figures

METHOD AND APPARATUS FOR CALIBRATING GYROSCOPICALLY-STABILIZED, MAGNETICALLY-SLAVED HEADING REFERENCE SYSTEM

GOVERNMENT LICENSE

The invention described herein may be manufactured and used by or for the Government for governmental purposes without the payment of any royalties thereon or therefor.

CONTINUING APPLICATION

This application is a continuation-in-part of application Ser. No. 005,255, filed Jan. 22, 1979, now abandoned.

INCORPORATION BY REFERENCE

The entire test of U.S. Pat. No. 4,143,467, issued Mar. 13, 1979, including illustrations, is hereby incorporated by reference for essential material as permitted by MPEP 608.01(P).

BACKGROUND OF THE INVENTION (a) Field of the Invention

Broadly speaking, this invention relates to gyroscopically-stabilized, magnetically-slaved heading reference systems. More particularly, in a preferred embodiment, this invention relates to methods and apparatus for calibrating the magnetic sensor used therein.

(b) Discussion of the Prior Art

Most modern military vehicles utilize a heading reference system for navigation and fire control purposes. Typically, such systems are gyroscopically-stabilized and magnetically-slaved, that is they employ a flux valve or magnetic compass. Unfortunately, the magnetic compass in a vehicle is subject to heading errors caused by magnetic deviation. Therefore, the compass must periodically be calibrated so that the known error can be added to or subtracted from the indicated heading to obtain the true magnetic heading.

Existing techniques for calibrating a magnetic compass take several hours and require from 2 to 3 persons. Essentially, they involve swinging the vehicle either manually or electronically, and hence the compass, and comparing the readings obtained against a known standard compass free from deviation error.

SUMMARY OF THE INVENTION

It is accordingly an object of this invention to provide methods and apparatus for calibrating a magnetic compass that significantly reduce the amount of time required for the calibration, which are fully automatic in operation, and which can be performed by the pilot alone, without the use of external aids.

The above and other objects have been attained by a method of calibrating a gyroscopically-stabilized, magnetically-slaved heading reference system, the system being mounted in a vehicle and including a flux valve magnetic sensor and a gyroscopic compass, both of which generate an output signal which is a function of the heading of the vehicle.

The method comprises the steps of:

(a) orienting the vehicle in a first direction;

(b) comparing the output signal from the flux valve magnetic sensor with the output signal from the gyroscopic compass, to generate an error signal;

(c) storing the error signal; and then (d) re-iterating steps (a) through (c) until sufficient error signals have been stored to calibrate the heading reference system.

The invention and its mode of operation will be more fully comprehended from the following detailed description when taken with the appended drawings, in which:

DETAILED DESCRIPTION OF THE INVENTION

Figure 1:
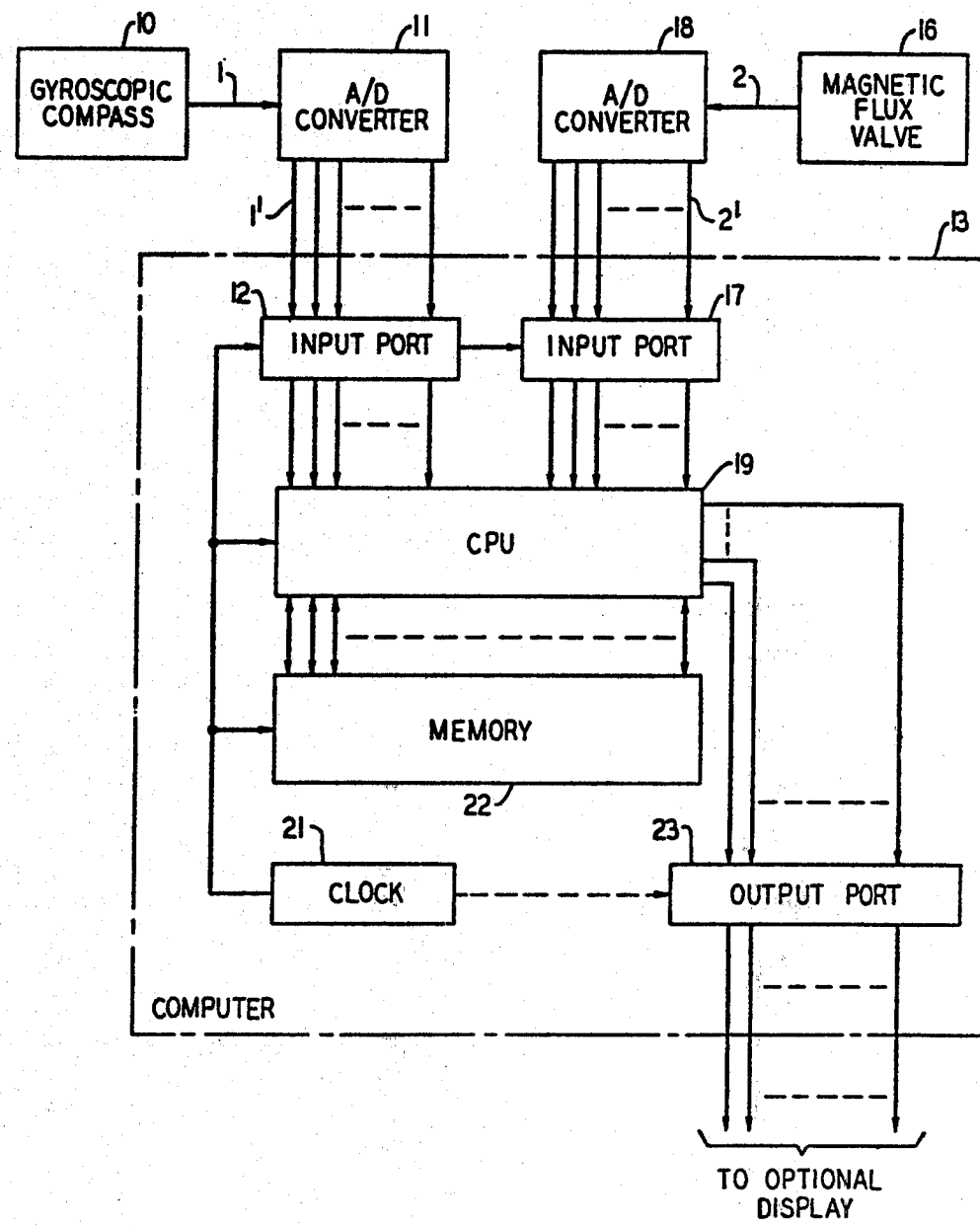
FIG. 1 is a block schematic drawing of an illustrative compass connecting apparatus according to the invention.

FIG. 1 depicts an illustrative embodiment of the invention. As shown, the analog output of a gyroscopic compass 10 is applied to a first analog-to-digital converter 11, thence, to a first input port 12 of a computer 13. In like manner, the analog output of a flux valve, or magnetic sensor, 16 is applied to a second input port 17 of the computer, via a second analog-to-digital converter 18.

Computer 13 may be of any known type, for example, a microcomputer using the Intel 8080 or Motorola MC6800 microprocessor. The program to run the computer is shown in flowchart form in FIG. 2 and may be stored in ROM or EPROM. The program may also be loaded into RAM from magnetic tape or disc. The computer is entirely conventional and includes a CPU 19, a clock 21, memory 22 and an output port 23.

In operation, the gyroscopic compass 10 and flux valve 16 (magnetic sensor) independently transmit analog heading information to the two analog-to-digital converters. The converters transform the analog heading information to a digital format which is compatible with the microprocessor.

Figure 2:
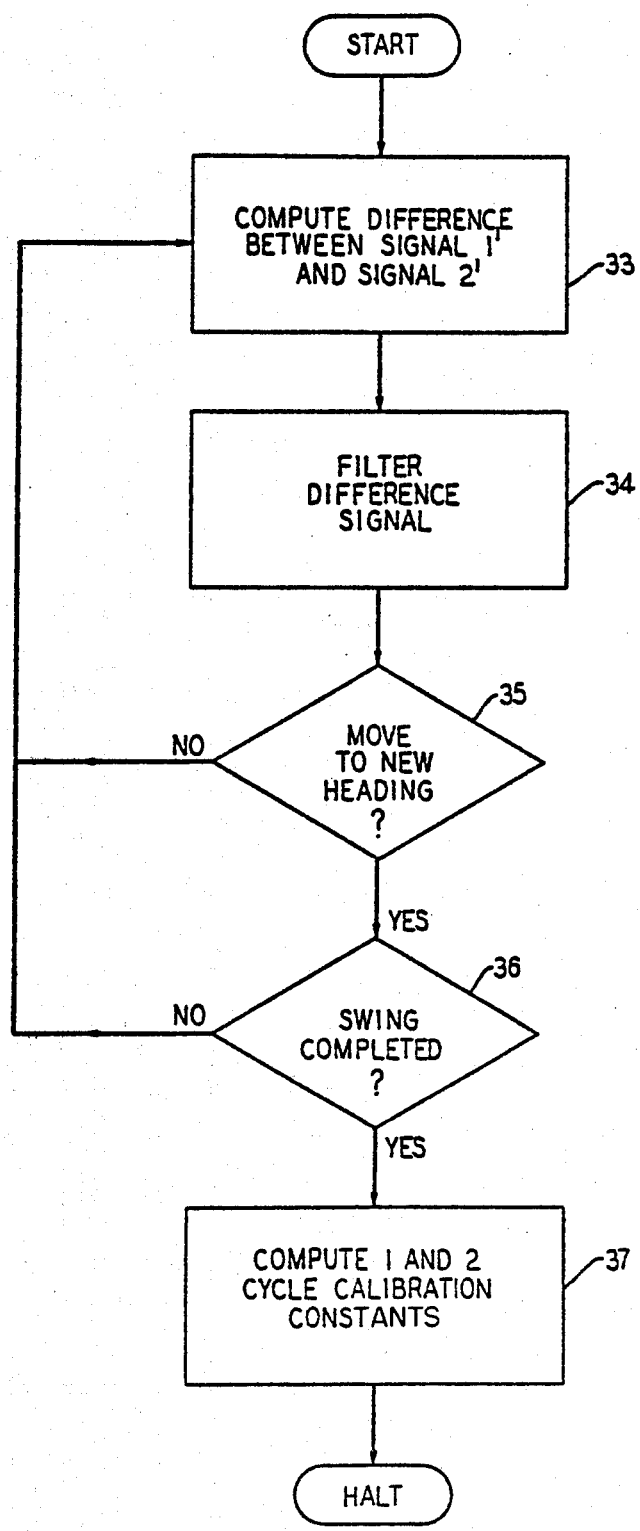
FIG. 2 is a flow chart illustrating the operation of the circuit shown in FIG. 1.

As shown in FIG. 2, the computer periodically samples and stores in memory, digital heading angles 1' and 2' from the gyroscopic compass and flux valve, respectively. The frequency of this sampling is a function of computer speed, filter design, and the characteristics of the magnetic sensor, gyroscopic compass, and noise. When a magnetic sensor calibration is requested, the computer enters the calibration routine shown in the flowchart. The calibration routine computes and smoothes the difference angle or error (1'-2') as shown in block 33. The type of smoothing or filtering performed on this difference angle may change from application to application. The computer will remain in a loop consisting of blocks 33 and 34 until enough data has been gathered to obtain a good estimate of the error at heading 2'.

It should be noted that a simple averaging filter, or its recursive implementation, $$\bar{\epsilon} = \frac{1}{N} \sum_{n=0}^{N} \epsilon_n$$

Where

N => Number of samples $\bar{\epsilon}$ => Average error $\epsilon_n$ => Error samples (which include random noise)

can be used to reduce the noise if the calibrator/pilot positions the vehicle on the ground during the data gathering and filtering period. In general, as the filtering time increases and the gyro drift characteristics are improved, the confidence level of the estimated error increases. The use of a more complex filter, as discussed below, would minimize the operational constraints during calibration.

When a good estimate of heading error has been obtained, the program proceeds to block 35 requesting a new heading. The above processing, in blocks 33 and 34, will begin again when the vehicle has settled on a new heading. The computer will continue to accept raw data, compute the heading error, filtering the error signal, and commanding a move to a new heading until enough information has been collected to allow an accurate determination of the flux valve calibration/compensation constants. The computer will then, in block 37, process the error data and obtain the compensation constants. These constants are then stored in non-volatile memory or read-out of port 23 for future reference and study.

Whenever power is applied to the heading reference system, the compensation constants stored in non-volatile memory are used to produce corrected magnetic heading.

Other embodiments of the invention, such as the use of a strapdown magnetic sensor, or use of a different filtering algorithm may allow continued vehicle rotation (instead of periodic stopping) and reduce the total calibration time.

The basic methodology used in this invention is to record the heading angle difference (error) between the gyroscope, in an unconstrained or free mode, and the magnetic sensor (flux valve), in either raw or filtered form, while the vehicle is rotated continuously or stopped at various headings through an angle of 360 degrees or less. The difference angle between the gyroscope and the magnetic sensor represents, in the short term, errors caused by magnetic field perturbations including index, one cycle, and two cycle errors. At a single heading, the static difference angle is given as:

$$DA_i = I + A \cos(\psi) + B \sin(\psi) + C \cos(2\psi) + D \sin(2\psi) + W + H$$

where
$DA_i$ = angle difference at one heading
$I$ = index error
$A,B$ = magnitudes of one-cycle error
$C,D$ = magnitudes of two-cycle error
$\psi$ = heading
$W$ = error due to gyro drift
$H$ = higher order terms The heading angle differences are used to compute the value of the constants A, B, C, D and thereby to compensate for the one and two cycle errors. Pre-indexed flux valves or external updates (positional or angular) may be used to eliminate index error. The additional error introduced by the gyro drift is time dependent and can be effectively neglected if the total calibration time of vehicle rotation is short compared to the drift characteristic. In addition, the drift error can be removed from the total error curve if the gyro drift rate can be determined during the calibration.

The operation of the invention can best be described by considering a typical calibration scenario. A calibration request is initiated by the operator while the vehicle is in a stationary position. The difference angle between the gyroscope and the magnetic sensor is sampled and averaged to reduce noise content. The averaged or smoothed difference angle is then stored and the pilot is requested to rotate and position the vehicle to a new heading, illustratively 45±5 degrees from the previous heading. The process is repeated at the new heading. The entire process is continued until a sufficient number of smoothed difference angles (errors) is obtained.

The difference angles can be used to estimate the coefficients A, B, C, D which characterize the one and two cycle errors (see Equation 1). These coefficients can then be utilized by the computer, or by some other parts of the heading reference system, to compensate for the one and two cycle errors.

As mentioned, the logic and computation required is typically performed by a digital computer of the microprocessor class; however, other computational devices may be employed, such an analog computers, etc. Further, various computation techniques may be used to compute the compensation coefficients. These include, but are not limited to, methods using weighted least squares, Fourier transform/series, or Kalman filter algorithms. Also the choice of the technique used depends upon the accuracy and speed of calibration desired, the type of vehicle and magnetic sensor, the heading reference used, and the type of computer employed, etc.

It may be possible, through the use of computational techniques, to calibrate the flux valve without stopping the vehicle at a particular heading to collect data, as noted above. The calibration would be performed while the vehicle is continuously rotated.

The use of a strapdown magnetic sensor, rather than the typical pendulous type, would make it easier to calibrate the magnetic sensor while the vehicle is continuously rotated, though an accurate vertical reference is required for the coordinate transformation under these circumstances.

The performance of the system outlined above was verified in a series of test flights made with a fully-instrumented helicopter over both flat and mountainous terrain. Comparing calibrated heading with inertial heading, four types of tests were conducted:
 (1) Straight and level
 (2) Nap-of-the-Earth (NOE)
 (3) Special Mission
 (4) Self-Calibration In a typical straight and level flight, the aircraft flew 33.8 Km at a heading of 133°, then 32.7 Km at a heading of 24°, then 19.8 Km at a heading of 162°, then 23.5 Km at a heading of 270°, then 23.3 Km at a heading of 230°.

During this test, the aircraft flew at from 20 to 200 ft. above ground level at speeds of from 70-100 knots and better than 30 knots over the checkpoints. Between checkpoints, maximum pitch and roll attitudes were 5° and 15°, respectively. At checkpoints, pitch and roll increased to 15° and 30°, respectively.

Table I, below, summarizes the results of the above, and other similar, test flights.

TABLE I

| SUMMARY OF STRAIGHT AND LEVEL FLIGHTS | | | |
|---|---|---|---|
| | MEAN | STANDARD DEVIATION | RMS |
| Test Flight #1 | −0.18° | 0.63° | 0.65° |
| Test Flight #2 | −0.26° | 0.49° | 0.55° |
| Test Flight #3 | −0.38° | 0.72° | 0.82° |

TABLE I-continued

| SUMMARY OF STRAIGHT AND LEVEL FLIGHTS | | | |
|---|---|---|---|
| | MEAN | STANDARD DEVIATION | RMS |
| Test Flight #4 | −0.40° | 0.55° | 0.68° |
| COMPOSITE RESULTS | −0.32° | 0.61° | 0.69° |

A typical NOE flight covered approximately 28.2 Km over two legs The altitude varied from 5 to 20 ft. above ground level at speeds of from 10 to 30 knots with occasional bursts up to 60 knots. The maximum pitch and roll attitudes were 25° and 45°, respectively.

Table II, below, summarizes the results of a series of NOE flights.

TABLE II

| SUMMARY OF NOE FLIGHTS | | | |
|---|---|---|---|
| | MEAN | STANDARD DEVIATION | RMS |
| Test Flight #1 | −0.57° | 1.07° | 1.22° |
| Test Flight #2 | −0.18° | 0.39° | 0.43° |
| Test Flight #3 | −0.59° | 0.83° | 1.02° |
| Test Flight #4 | 0.03° | 0.93° | 0.93° |
| COMPOSITE RESULTS | −0.31° | 0.87° | 0.92° |

The special mission flight profile consisted of a series of unusual maneuvers. The first was a 720° pedal turn (a complete 720° Left/Right turn in 30–40 seconds) at less than 25 feet. The second was an accelerate/decelerate (0–100–0 knots) once at normal rates (1.5 minutes) and once at slow rates (4 minutes) again at 25 feet.

The other maneuvers, all performed at 1000 feet, were a snake-like course at 75 knots, a "Figure-8" course at 70 knots, a racetrack course with flat turns at 50–60 knots in the turn and 80 knots in the straightaway, flat circles at 50–60 knots and simulated pop-ups on the same target from different points.

Table III below, summarizes the results of these special maneuvers, each of which was performed at least three times.

TABLE III

| SUMMARY OF SPECIAL MISSION FLIGHTS | | | |
|---|---|---|---|
| | MEAN | STANDARD DEVIATION | RMS |
| FIG. 8 | −0.58° | 1.88° | 1.97° |
| Snake | 0.31° | 1.20° | 1.24° |
| Flat Circles | −0.29° | 0.46° | 0.54° |
| 720° Hover Turn | 0.54° | 0.52° | 0.75° |
| Racetrack | 0.06° | 0.61° | 0.62° |
| Accel/Decel | −0.27° | 0.66° | 0.71° |
| Pop-Up | 0.33° | 0.45° | 0.56° |
| COMPOSITE RESULTS | 0.01° | 0.79° | 0.79° |

The procedure used for the self-calibration tests, was as follows: (It should be noted that this is not necessarily the optimum procedure.)

1. Position the helicopter in a magnetically clear area.
2. Start the aircraft engines using standard checklist.
3. Position the aircraft at a heading of 000°±5°, magnetic, on visually level ground; switch to calibrate mode; start computer program.
4. Rotate the aircraft to a heading of 045°±5° when the computer light illuminates; start computer program.
5. Repeat step (4) seven times (rotating the aircraft clockwise approximately 45° each time through 360°). The computer will indicate whether or not the calibration was valid. If valid, terminate calibration. If invalid, repeat steps 3 through 5.

Table IV, below, gives the results of a typical self-calibration.

TABLE IV

| | TEST 1 | TEST 2 |
|---|---|---|
| Time of Callibration | 5 min. | 7 min. |
| Error Before Swing | ERROR | ERROR |
| 1 Cycle N–S | 0.10 | 0.10 |
| E–W | 1.10 | 1.10 |
| 2 Cycle Cardinal | 0.0 | 0.0 |
| Inter-Cardinal | −0.18 | −0.18 |
| Calibration Check | | |
| AIRCRAFT HEADING | ERROR | ERROR |
| 000° | 0.02 | 0.04 |
| 045° | −0.33 | −0.06 |
| 090° | −0.03 | 0.04 |
| 135° | 0.27 | 0.09 |
| 180° | 0.07 | 0.19 |
| 225° | −0.23 | −0.16 |
| 270° | −0.13 | −0.11 |
| 315° | 0.37 | −0.06 |
| Residual Error | ERROR | ERROR |
| 1 Cycle N–S | −0.03 | −0.08 |
| E–W | 0.05 | 0.08 |
| 2 Cycle Cardinal | 0.06 | 0.08 |
| Inter-Cardinal | −0.30 | −0.06 |

Based on a large number of tests, the following observations were made:

COMPASS CALIBRATION RESULTS*

Average time required/calibration 9 minutes.
Standard deviation of the residual errors=0.18°.**

*These results are based on 10 different compass swings at two geographic locations.
**The index or mean error was assumed to be equal to zero, due to use of a pre-indexed flux valve. In the real world, however, the error contributed by this pre-indexed flux valve misalignment would be 0.1°.

It is interesting to compare the time, accuracy and manpower needs to perform a conventional compass calibration with that required when the method according to the invention is employed. This comparison is shown in Table V, below:

TABLE V

| COMPARISON OF COMPASS CALIBRATION METHODS | | | |
|---|---|---|---|
| | MANUAL SWING COMPASS ROSE | MC-2 ELECTRICAL SWING | SELF-CALIBRATIOM |
| Time Required | 3–4 hours | 4–6 hours | 10 minutes |
| Personnel Required | 2 minimum | 1–2 | 1 |
| Test Equipment Size | — | 17.8 ft.³ | |
| Weight | 3 lbs. | 285 lbs. | NONE |
| Cost | $20.00 | $40,000 | |
| Special | Surveyed | Surveyed | Pre-Indexed Flux-Valve Magnetically |

TABLE V-continued

| COMPARISON OF COMPASS CALIBRATION METHODS | | | |
|---|---|---|---|
| | MANUAL SWING COMPASS ROSE | MC-2 ELECTRICAL SWING | SELF-CALIBRATIOM |
| Requirements | Compass Rose | N-S Line | Stable Area |
| Accuracy Achieveable | 2° | 0.25° | 0.5° |

The following conclusions can be drawn from the foregoing tests.

CONCLUSIONS

1. Much of the heading error during straight and level flight can be attributed to a non-constant velocity (i.e. pilot induced accelerations and decelerations along the course) which generated a flux valve hang off; and 2. The self-calibration technique performed well within specifications requirements: A typical calibration took 7 minutes with the errors −0.5°.

If increased accuracy is required, the use of a gyro having a lower drift rate to minimize error during long periods of cutout, is suggested.

One skilled in the art may make various changes and substitutions to the layout of parts shown without departing from the spirit and scope of the invention.

What is claimed is:

1. Apparatus for compensating for errors in the heading output signal of a magnetic azimuth detector mounted in an aircraft, comprising:

inertial heading reference means for providing a heading reference signal in accordance with the heading of said aircraft, heading compensation means responsive to said heading output signal and said heading reference signal for compensating said heading output signal for said errors in accordance with the differences between said heading output signal and said heading reference signal at a plurality of predetermined headings of said aircraft, and drift compensation means for compensating said heading reference signal for drift of said inertial heading reference means with respect to said plurality of predetermined headings, thereby providing a compensated heading output signal compensated for said errors.

2. The apparatus of claim 1 in which said inertial heading reference means comprises directional gyroscope means.

3. The apparatus of claim 1 in which said magnetic azimuth detector and said inertial heading reference means comprise part of a gyro magnetic compass system for said aircraft, said inertial heading reference means comprising the directional gyroscope means thereof.

4. The apparatus of claim 1 in which said plurality of predetermined headings comprise eight points of the compass spaced 45 degrees apart.

5. Method for compensating the heading output signal of a magnetic azimuth detector mounted in an aircraft for errors, said aircraft having an inertial heading reference, comprising the steps of:

orienting said aircraft successively to a plurality of predetermined headings, obtaining differences between the heading output signal of said magnetic azimuth detector and the heading reference signal from said inertial heading reference at said plurality of predetermined headings, compensating said heading reference signal for drift of said inertial heading reference with respect to said plurality of predetermined headings, and compensating said heading output signal for said errors in accordance with said differences between said heading output signal and said heading reference signal.

6. A method of calibrating a gyroscopically-stabilized, magnetically-slaved heading reference system, said system being mounted in a vehicle and including a flux valve magnetic sensor and a gyroscopic compass both of which generate an output signal which is a function of the heading of the vehicle, which comprises the steps of:

(a) orienting said vehicle in a first direction;

(b) comparing the output signal from said flux valve magnetic sensor with the output signal from said gyroscopic compass, thereby to generate an error signal;

(c) storing said error signal; and then (d) re-iterating steps (a) through (c) until sufficient error signals have been stored to form an equation to calibrate said reference system.

7. The method according to claim 6 wherein the outputs from said flux valve magnetic sensor and said gyroscopic compass are analog, said method comprising the further steps of (e) prior to step (b), converting said outputs from analog to digital.

8. The method according to claim 7 comprising the further steps of:

(f) prior to step (c), filtering said error signal to reduce noise.

9. The method according to claim 8, wherein said error signal is given by an equation of the form $$DAi = I + A \cos(\psi) = B \sin(\psi) + C \cos(2\psi) + D \sin(2\psi) + W + H$$

where
   $DAi$ = angle difference at one heading
   $I$ = index error
   $A, B$ = magnitudes of one cycle error
   $C, D$ = magnitudes of two cycle error
   $\psi$ = heading
   $W$ = error due to gyro drift
   $H$ = higher order terms, and step (d) further comprises:

(g) re-iterating steps (a) through (c) until sufficient error signals have been stored to simultaneously solve the above equation for the constants A, B, C, D, W and H.

10. Apparatus for calibrating a gyroscopically-stabilized, magnetically-slaved heading reference system, said system being mounted in a vehicle and including a flux valve magnetic sensor and gyroscopic compass, both of which generate an output signal which is a function of the heading of the vehicle which comprises:

a first A/D converter for converting the analog output of said flux valve magnetic sensor into a digital output;

a second A/D converter for converting the analog output of said gyroscopic compass into a digital output;

means, connected to said first and second A/D converter for generating an error signal corresponding to the difference between the two digital outputs; wherein said generating means comprises a programmed digital computer, including:

means for filtering said error signal to reduce noise; and memory means for storing said filtered error signal;

whereby said programmed digital computer is used to form an equation for calibrating outputs of said flux valve and gyroscopic compass into an actual heading.

11. The apparatus according to claim 10 wherein said generating means comprises a programmed digital computer, including:

means for filtering said error signal to reduce noise; and memory means for storing said filtered error signal.

12. A method of calibrating a gyroscopically-stabilized, magnetically-slaved heading reference system, said system being mounted in a vehicle and including a strapdown-type flux valve magnetic sensor and a gyroscopic compass both of which generate an output signal which is a function of the heading of the vehicle, which comprises the steps of:

(a) orienting said vehicle in a first direction;

(b) comparing the output signal from said flux valve magnetic sensor with the output signal from said gyroscopic compass, thereby to generate an error signal;

(c) storing said error signal; and (d) continuously rotating the vehicle so as to reiterate steps (a) through (c), continuously generating error signals and wherein a programmed computer is used to generate calibration constants for the reference system.

13. The method according to claim 12 wherein said error signal is given by an equation of the form $$DA_i = I + A \cos(\psi) + B \sin(\psi) + C \cos(2\psi) + D \sin(2\psi) + W + H$$

where
$DA_i$ = angle difference at one heading
$I$ = index error
$A, B$ = magnitudes of one cycle error
$C, D$ = magnitudes of two cycle error
$\psi$ = heading
$W$ = error due to gyro drift
$H$ = higher order terms, and step (d) further comprises:

(e) reiterating steps (a) through (d) until sufficient error signals have been stored to simultaneously solve the above equation for the constants A, B, C, D, W and H.

14. The method of claim 13 wherein the method of calculating the constants comprises use of a Kalman filter algorithm.

15. The method of claim 13 wherein the method of calculating the constants comprises use of a Fourier Transform Series algorithm.

16. The method of claim 13 wherein the method of calculating the constants comprises use of a weighted least squares algorithm.

17. The method of claim 13 wherein the computer is a programmed digital computer which samples and averages, thereby smoothing, the error signal, being a difference angle between the compass and sensor generated angles.

18. The method of claim 17 whereby the sampling is done by a simple averaging filter.

19. The method of claim 18 wherein the validity of the calibration constants is checked by the computer.

20. The method of claim 19 wherein the constants are stored in non-volatile memory and wherein upon power being applied to the heading reference system, the constants stored in non-volatile memory are used to produce an initially corrected magnetic heading.

21. Apparatus for compensating for errors in the heading output signal of a magnetic azimuth detector mounted in a moving vehicle, comprising:

inertial heading reference means for providing a heading reference signal in accordance with the heading of said moving vehicle, heading compensation means responsive to said heading output signal and said heading reference signal for compensating said heading output signal for said errors in accordance with the differences between said heading output signal and said heading reference signal at a plurality of headings of said moving vehicle, and drift compensation means for compensating said heading reference signal for drift of said inertial heading reference means with respect to said plurality of headings, thereby providing a compensated heading output signal compensated for said errors.

22. Method for compensating the heading output signal of a magnetic azimuth detector mounted in a moving vehicle for errors, said moving vehicle having an inertial heading reference, comprising the steps of:

orienting said moving vehicle successively to a plurality of headings, obtaining differences between the heading output signal of said magnetic azimuth detector and the heading reference signal from said inertial heading reference at said plurality of headings, compensating said heading reference signal for drift of said inertial heading reference with respect to said plurality of headings, and compensating said heading output signal for said errors in accordance with said differences between said heading output signal and said heading reference signal.

* * * * *